(12) United States Patent
Maral et al.

(10) Patent No.: US 11,613,657 B2
(45) Date of Patent: *Mar. 28, 2023

(54) USE OF A COATING ON A CHROMIUM-FREE TINPLATE SUBSTRATE

(71) Applicant: PPG Industries Ohio, Inc., Cleveland, OH (US)

(72) Inventors: Jean-Luc Maral, Yvetot (FR); Laudine Ducrocq, Rogerville (FR); Sylvie Foucher, Sanit Martin du Manoir (FR); Yves Hamon, Harfleur (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/347,344

(22) PCT Filed: Nov. 3, 2017

(86) PCT No.: PCT/US2017/059982
§ 371 (c)(1),
(2) Date: May 3, 2019

(87) PCT Pub. No.: WO2018/085686
PCT Pub. Date: May 11, 2018

(65) Prior Publication Data
US 2019/0284400 A1    Sep. 19, 2019

Related U.S. Application Data

(60) Provisional application No. 62/557,895, filed on Sep. 13, 2017.

(30) Foreign Application Priority Data

Nov. 3, 2016  (EP) ..................... 16197174

(51) Int. Cl.
| | | |
|---|---|---|
| C09D 5/03 | (2006.01) | |
| B05D 7/14 | (2006.01) | |
| B05D 7/00 | (2006.01) | |
| C08L 67/02 | (2006.01) | |
| C09D 167/02 | (2006.01) | |
| B65D 25/34 | (2006.01) | |
| B65D 25/14 | (2006.01) | |
| C09D 167/00 | (2006.01) | |
| C09D 5/00 | (2006.01) | |
| C09D 127/06 | (2006.01) | |
| C08K 5/3492 | (2006.01) | |
| C08L 61/04 | (2006.01) | |
| C08G 63/183 | (2006.01) | |
| C08G 63/20 | (2006.01) | |

(52) U.S. Cl.
CPC ................. *C09D 5/03* (2013.01); *B05D 7/14* (2013.01); *B05D 7/52* (2013.01); *B65D 25/14* (2013.01); *B65D 25/34* (2013.01); *C08L 67/02* (2013.01); *C09D 5/002* (2013.01); *C09D 127/06* (2013.01); *C09D 167/00* (2013.01); *C09D 167/02* (2013.01); *B05D 2202/15* (2013.01); *C08G 63/183* (2013.01); *C08G 63/20* (2013.01); *C08K 5/3492* (2013.01); *C08L 61/04* (2013.01); *C08L 2312/04* (2013.01)

(58) Field of Classification Search
CPC .......... C08K 5/3492; C09D 167/00–08; B05D 7/52
See application file for complete search history.

(56) References Cited

U.S. PATENT DOCUMENTS

| | | | |
|---|---|---|---|
| 2001/0051227 A1 | 12/2001 | Jung et al. | |
| 2005/0014012 A1 | 1/2005 | Stapperfenne et al. | |
| 2016/0272576 A1* | 9/2016 | Gibanel | C08G 65/40 |

FOREIGN PATENT DOCUMENTS

| | | | | |
|---|---|---|---|---|
| CN | 103013303 B | 7/2015 | | |
| EP | 2959981 A1 | 12/2015 | | |
| WO | WO-2014006031 A | * 1/2014 | | C25D 5/48 |

OTHER PUBLICATIONS

Scifinder, Properties of CAS 86475-92-5 (2022).*
Scifinder, Properties of CAS 112-37-2 (2022).*

* cited by examiner

*Primary Examiner* — Kregg T Brooks
(74) *Attorney, Agent, or Firm* — Shantanu C. Pathak

(57) ABSTRACT

Use of a coating composition on a chromium free tinplate substrate, the coating composition comprising: a polyester material, and benzoguanamine or a derivative thereof, wherein the coating composition is substantially free of bisphenol A (BPA), bisphenol F (BPF), bisphenol A diglycidyl ether (BADGE) and bisphenol F diglycidyl ether (BFDGE).

6 Claims, No Drawings

USE OF A COATING ON A CHROMIUM-FREE TINPLATE SUBSTRATE

The present invention relates to the use of any of a coating composition, a powder coating composition and a coating system on a chromium free tinplate substrate; and to a chromium free tinplate substrate coated with any of a coating composition, a powder coating composition and a coating system. The present invention also extends to a food or beverage can at least partially formed from a chromium free tinplate material, wherein the chromium free tinplate material is coated on at least a portion thereof with any of a coating composition, a powder coating composition and a coating system.

Tinplate is commonly used to form food and/or beverage cans. Tinplate is steel sheet which is coated with a thin layer of tin. Untreated tinplate can undergo corrosion which can affect the look and suitability of the tinplate in making a food and/or beverage can. Furthermore, untreated tinplate typically develops a dark, irregular stain when contacted with sulphur-containing products under the conditions used for food processing. Sulphur-containing products include, for example, food and/or beverage products that contain sulphur-containing proteins, which are present in many food products that are packaged in tinplate cans such as, for example, sardines, tuna fish, split peas, beans, lentils, pate and pet food. After contact with the packaged contents, the interior surface of the tinplate can often become stained due to the formation of tin sulphides (or other metal sulphides) as a result of contact with the sulphur-containing products contained therein.

In order to inhibit or retard corrosion or to inhibit or retard the above mentioned staining, it is known in the art for tinplate to undergo one or more pre-treatment step. The pre-treatment may comprise a passivation process which may comprise immersing or coating the tinplate sheet substrate in one or more passivation solution(s). It is well known for the passivation solutions to comprise chromium compounds such as, for example, disodium chromate.

However, for safety and environmental reasons there is a desire to avoid the use of chromium in the pre-treatment of tinplate. To address this, pre-treatment processes for tin plate which do not use chromium are being developed. This results in tinplate materials which are said to be chromium free. While these chromium free tinplate materials may exhibit resistance to corrosion or staining, a problem arises in that various known coating compositions can suffer from poor adhesion to chromium free tinplate and/or can suffer poor inter-coat adhesion.

It is an object of aspects of the present invention to address the above mentioned or other problems.

According to a first aspect of the present invention there is provided the use of a coating composition on a chromium free tinplate substrate, the coating composition comprising:
  a polyester material, and
  benzoguanamine or a derivative thereof,
  wherein the coating composition is substantially free of bisphenol A (BPA), bisphenol F (BPF), bisphenol A diglycidyl ether (BADGE) and bisphenol F diglycidyl ether (BFDGE).

According to a second aspect of the present invention there is provided the use of a powder coating composition on a chromium free tinplate substrate, the powder coating composition comprising:
  a further polyester material,
  wherein the powder coating composition is substantially free of bisphenol A (BPA), bisphenol F (BPF), bisphenol A diglycidyl ether (BADGE) and bisphenol F diglycidyl ether (BFDGE).

According to a third aspect of the present invention there is provided the use of a coating system on a chromium free tinplate substrate the coating system comprising:
  as an undercoat, a coating composition comprising:
    a polyester material, and
    benzoguanamine or a derivative thereof, and
  as an overcoat, a powder coating composition comprising:
    a further polyester material,
  wherein the coating system is substantially free of bisphenol A (BPA), bisphenol F (BPF), bisphenol A diglycidyl ether (BADGE) and bisphenol F diglycidyl ether (BFDGE).

According to a fourth aspect of the present invention, there is provided a chromium free tinplate substrate coated with a coating composition, the coating composition comprising:
  a polyester material, and
  benzoguanamine or a derivative thereof,
  wherein the coating composition is substantially free of bisphenol A (BPA), bisphenol F (BPF), bisphenol A diglycidyl ether (BADGE) and bisphenol F diglycidyl ether (BFDGE).

According to a fifth aspect of the present invention, there is provided a chromium free tinplate substrate coated with a powder coating composition, the powder coating composition comprising:
  a further polyester material,
  wherein the powder coating composition is substantially free of bisphenol A (BPA), bisphenol F (BPF), bisphenol A diglycidyl ether (BADGE) and bisphenol F diglycidyl ether (BFDGE).

According to a sixth aspect of the present invention there is provided a chromium free tinplate substrate coated with a coating system the coating system comprising:
  as an undercoat, a coating composition comprising:
    a polyester material, and
    benzoguanamine or a derivative thereof, and
  as an overcoat, a powder overcoat coating composition comprising;
    a further polyester material,
  wherein the coating system is substantially free of bisphenol A (BPA), bisphenol F (BPF), bisphenol A diglycidyl ether (BADGE) and bisphenol F diglycidyl ether (BFDGE).

According to a seventh aspect of the present invention there is provided a food or beverage can at least partially formed from a chromium free tinplate material, wherein the chromium free tinplate material is coated on at least a portion thereof with a coating composition, the coating composition comprising:
  a polyester material, and
  benzoguanamine or a derivative thereof,
  wherein the coating composition is substantially free of bisphenol A (BPA), bisphenol F (BPF), bisphenol A diglycidyl ether (BADGE) and bisphenol F diglycidyl ether (BFDGE).

According to an eighth aspect of the present invention there is provided a food or beverage can at least partially formed from a chromium free tinplate material, wherein the chromium free tinplate material is coated on at least a portion thereof with a powder coating composition, the powder coating composition comprising:

a further polyester material,
wherein the powder coating composition is substantially free of bisphenol A (BPA), bisphenol F (BPF), bisphenol A diglycidyl ether (BADGE) and bisphenol F diglycidyl ether (BFDGE).

According to a ninth aspect of the present invention there is provided a food or beverage can at least partially formed from a chromium free tinplate material, wherein the chromium free tinplate material is coated on at least a portion thereof with a coating system, the coating system comprising:
  as an undercoat, a coating composition comprising;
    a polyester material, and
    benzoguanamine or a derivative thereof, and
  as an overcoat, a powder coating composition comprising;
    a further polyester material,
wherein the coating system is substantially free of bisphenol A (BPA), bisphenol F (BPF), bisphenol A diglycidyl ether (BADGE) and bisphenol F diglycidyl ether (BFDGE).

The coating compositions of the present invention, when cured, may have a flexibility of at least 20 mm as measured according to the draw and re-draw test method with processing in 1% salt (NaCl) solution in tap water at 130° C. for 60 minutes and/or a scratch resistance of at least 700 g as measured according to ISO Standard 1518-1:2011. Suitably, the coating composition of the present invention, when cured, may have a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

Thus, according to a tenth aspect of the present invention there is provided the use of a coating composition on a chromium free tinplate substrate, the coating composition comprising:
  a polyester material, and
  benzoguanamine or a derivative thereof,
wherein the coating composition is substantially free of bisphenol A (BPA), bisphenol F (BPF), bisphenol A diglycidyl ether (BADGE) and bisphenol F diglycidyl ether (BFDGE), and wherein the coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

According to an eleventh aspect of the present invention there is provided the use of a coating system on a chromium free tinplate substrate the coating system comprising:
  as an undercoat, a coating composition comprising;
    a polyester material, and
    benzoguanamine or a derivative thereof, and
  as an overcoat, a powder coating composition comprising;
    a further polyester material,
wherein the coating system is substantially free of bisphenol A (BPA), bisphenol F (BPF), bisphenol
A diglycidyl ether (BADGE) and bisphenol F diglycidyl ether (BFDGE), and wherein the coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

According to a twelfth aspect of the present invention, there is provided a chromium free tinplate substrate coated with a coating composition, the coating composition comprising:
  a polyester material, and
  benzoguanamine or a derivative thereof,
wherein the coating composition is substantially free of bisphenol A (BPA), bisphenol F (BPF), bisphenol A diglycidyl ether (BADGE) and bisphenol F diglycidyl ether (BFDGE), and wherein the coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

According to a thirteenth aspect of the present invention there is provided a chromium free tinplate substrate coated with a coating system the coating system comprising:
  as an undercoat, a coating composition comprising;
    a polyester material, and
    benzoguanamine or a derivative thereof, and
  as an overcoat, a powder overcoat coating composition comprising;
    a further polyester material,
wherein the coating system is substantially free of bisphenol A (BPA), bisphenol F (BPF), bisphenol A diglycidyl ether (BADGE) and bisphenol F diglycidyl ether (BFDGE), and wherein the undercoat coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

According to a fourteenth aspect of the present invention there is provided a food or beverage can at least partially formed from a chromium free tinplate material, wherein the chromium free tinplate material is coated on at least a portion thereof with a coating composition, the coating composition comprising:
  a polyester material, and
  benzoguanamine or a derivative thereof,
wherein the coating composition is substantially free of bisphenol A (BPA), bisphenol F (BPF), bisphenol A diglycidyl ether (BADGE) and bisphenol F diglycidyl ether (BFDGE), and wherein the coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

According to a fifteenth aspect of the present invention there is provided a food or beverage can at least partially formed from a chromium free tinplate material, wherein the chromium free tinplate material is coated on at least a portion thereof with a coating system, the coating system comprising:
  as an undercoat, a coating composition comprising;
    a polyester material, and
    benzoguanamine or a derivative thereof, and
  as an overcoat, a powder coating composition comprising;
    a further polyester material,
wherein the coating system is substantially free of bisphenol A (BPA), bisphenol F (BPF), bisphenol A diglycidyl ether (BADGE) and bisphenol F diglycidyl ether (BFDGE), and wherein the undercoat coating composition, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

As used herein "chromium free tinplate" refers to a tinplate material that may or may not have undergone a pre-treatment process. Where the tinplate has undergone a pre-treatment process involving passivation, the passivation solutions used are substantially free, may be essentially free or may be completely free of chromium compounds such as, for example, disodium chromate. By "substantially free" we mean to refer to passivation solutions containing less than about 1000 parts per million (ppm) of chromium compounds such as, for example, disodium chromate. By "essentially free" we mean to refer to passivation solutions containing less than about 100 ppm of chromium compounds such as, for example, disodium chromate. By "completely free" we mean to refer to passivation solutions containing less than about 20 parts per billion (ppb) of chromium compounds such as, for example, disodium chromate.

Suitably, therefore, the passivation process does not comprise chromium compounds, such as hexavalent chromium compounds. For example, suitably the passivation process does not comprise contacting or immersing a tinplate sheet with and/or in a solution comprising chromium compounds such as hexavalent chromium compounds.

The passivation process may comprise a passivation 505 or 555 method, such as a 505 or 555 passivation method from Arcelor, TATA or US Steel, and/or a passivation method based on Henkel Granodine 1456. Suitably, the passivation may comprise the TATA passivation 505, Arcelor passivation 555, US Steel 555 and/or TKS passivation 555 methods.

The chromium free tinplate may be obtained from a commercial source.

The coating composition according to the present invention comprises a polyester material. The polyester material according to the present invention may comprise the reaction product of a polyacid and a polyol.

"Polyacid" and like terms as used herein, refers to a compound having two or more carboxylic acid groups, such as two, three or four acid groups, and includes an ester of the polyacid (wherein one or more of the acid groups is esterified) or an anhydride. The polyacid is suitably an organic polyacid.

The carboxylic acid groups of the polyacid may be connected by a bridging group selected from: an alkylene group; an alkenylene group; an alkynylene group; or an arylene group.

The polyester material may be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; esters and anhydrides of all the aforementioned acids and combinations thereof.

"Polyol" and like terms, as used herein, refers to a compound having two or more hydroxyl groups, such as two, three or four hydroxyl groups. The hydroxyl groups of the polyol may be connected by a bridging group selected from: an alkylene group; an alkenylene group; an alkynylene group; or an arylene group. Suitably the polyol is an organic polyol.

The polyester material may be formed from any suitable polyol. Suitable examples of polyols include, but are not limited to the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

The polyester material may comprise polymers or copolymers formed from the reaction of diols and diacids; polyols or polyacid components may optionally be used to produce branched polymers.

The polyester material may be formed from a diacid. Suitable examples of diacids include, but are not limited to the following: phthalic acid; isophthalic acid; terephthalic acid; 1,4 cyclohexane dicarboxylic acid; succinic acid; adipic acid; azelaic acid; sebacic acid; fumaric acid; 2,6-naphthalene dicarboxylic acid; orthophthalic acid; phthalic anhydride; tetrahydrophthalic anhydride; maleic anhydride; succinic anhydride; itaconic anhydride; di-ester materials, such as dimethyl ester derivatives for example dimethyl isophthalate, dimethyl terephthalate, dimethyl 1,4-cyclohexane dicarboxylate, dimethyl 2,6-naphthalene di carboxylate, dimethyl fumarate, dimethyl orthophthalate, dimethylsuccinate, dimethyl glutarate, dimethyl adipate; esters and anhydrides of all the aforementioned acids; and mixtures thereof.

Suitably, the polyester material may be formed from terephthalic acid, isophthalic acid, sebacic acid or combinations thereof.

The polyester material may be formed from a diol. The polyester material may be formed from any suitable diol. Suitable examples of diols include, but are not limited to the following: ethylene glycol; 1,2-propane diol; 1,3-propane diol; 1,2-butandiol; 1,3-butandiol; 1,4-butandiol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; diethylene glycol; triethylene glycol; dipropylene glycol; tripropylene glycol; 2,2,4-trimethyl pentane 1,3-diol; 1,4 cyclohexane dimethanol; tricyclodecane dimethanol; 2,2,4,4-tetramethyl cyclobutane 1,3-diol; isosorbide; 1,4-cyclohexane diol; 1,1'-isopropylidene-bis (4-cyclohexanol); and mixtures thereof.

Suitably, the polyester material may be formed from 2,2'-dimethyl 1,3-propanediol (neopentyl glycol), 1,4-butandiol, 2-methyl 1,3-propanediol, ethylene glycol, 1,6-hexanediol or combinations thereof.

Examples of suitable additional polyacids which can optionally be used to produce branched polymers include, but are not limited to the following: trimellitic anhydride;

trimellitic acid; pyromellitic acid; esters and anhydrides of all the aforementioned acids; and mixtures thereof.

Examples of suitable additional polyols which can optionally be used to produce branched polymers include, but are not limited to the following: glycerine; trimethylol propane; trimethylol ethane; 1,2,6 hexane triol; pentaerythritol; erythritol; di-trimethylol propane; di-pentaerythritol; N,N,N',N' tetra (hydroxyethyl)adipindiamide; N,N,N'N' tetra (hydroxypropyl)adipindiamide; other, primarily hydroxyl, functional branching monomers; or mixtures thereof.

The term "alk" or "alkyl", as used herein unless otherwise defined, relates to saturated hydrocarbon radicals being straight, branched, cyclic or polycyclic moieties or combinations thereof and contain 1 to 20 carbon atoms, suitably 1 to 10 carbon atoms, more suitably 1 to 8 carbon atoms, still more suitably 1 to 6 carbon atoms, yet more suitably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or heteroatom, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —$CH_3$, becomes methylene, —$CH_2$—, when represented as an alkylene. Other alkylene groups should be understood accordingly.

The term "alkenyl", as used herein, relates to hydrocarbon radicals having a double bond, suitably up to 4, double bonds, being straight, branched, cyclic or polycyclic moieties or combinations thereof and containing from 2 to 18 carbon atoms, suitably 2 to 10 carbon atoms, more suitably from 2 to 8 carbon atoms, still more suitably 2 to 6 carbon atoms, yet more suitably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH=CH2, becomes ethenylene, —CH=CH—, when represented as an alkenylene. Other alkenylene groups should be understood accordingly.

The term "alkynyl", as used herein, relates to hydrocarbon radicals having a triple bond, suitably up to 4, triple bonds, being straight, branched, cyclic or polycyclic moieties or combinations thereof and having from 2 to 18 carbon atoms, suitably 2 to 10 carbon atoms, more suitably from 2 to 8 carbon atoms, still more suitably from 2 to 6 carbon atoms, yet more suitably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$ or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The polyester material may be formed from any suitable molar ratio of polyacid:polyol. The molar ratio of polyacid:polyol in the polyester material may be from 10:1 to 1:10, suitably from 5:1 to 1:5, such as from 3:1 to 1:3, or even from 2:1 to 1:2. Suitably, the molar ratio of polyacid:polyol in the polyester material may be from 1.5:1 to 1:1.5, such as 1.2:1 to 1:1.2.

The polyester material may be formed from any suitable molar ratio of diacid:diol. The molar ratio of diacid:diol in the polyester material may be from 10:1 to 1:10, suitably from 5:1 to 1:5, such as from 3:1 to 1:3, or even from 2:1 to 1:2. Suitably, the molar ratio of diacid:diol in the polyester material may be from 1.5:1 to 1:1.5, such as 1.2:1 to 1:1.2 or even from 1.1:1 to 1:1.1.

The polyester material may optionally be formed from any suitable molar ratio of diacid+diol to polyacid and/or polyol. The polyester material may comprise a molar ratio of diacid+diol to polyacid and/or polyol of from 100:1 to 1:1, suitably from 100:1 to 5:1, such as from 100:1 to 20:1, or even from 100:1 to 50:1.

The polyester material may optionally be formed from additional monomers. Suitably, the polyester material may optionally include an additional monomer selected from monoacids or monohydric alcohols or combinations thereof. Suitably, the optional additional monomer may be organic.

The polyester material may optionally be formed from additional monoacids. "Monoacid", and like terms as used herein, refers to compounds having one carboxylic acid group and includes an ester of the monoacid (where the acid group is esterified) or an anhydride. The monoacid is suitably an organic monoacid.

The polyester material may optionally be formed from any suitable additional monoacid. Suitable examples include, but are not limited to the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; undecanoic acid; lauric acid; isononanoic acid; fatty acids; hydrogenated fatty acids of naturally occurring oils; esters and/or anhydrides of any of the aforementioned acids and combinations thereof.

The polyester material may optionally be formed from additional monohydric alcohols. "Monohydric alcohol" and like terms as used herein, refers to compounds having one hydroxyl group. Suitably, the monohydric alcohol is an organic monohydric alcohol.

The polyester material may optionally be formed from any suitable additional monohydric alcohol. Suitable examples include but are not limited to the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; phenol; phenyl carbinol; methylphenyl carbinol; cresol; monoethers of glycols; halogen-substituted or other substituted alcohols and combinations thereof.

The polyester material may comprise commercially available polyester materials. Suitable commercially available polyester materials include, but are not limited to the following: those sold under the trade name URALAC® commercially available from DSM, such as URALAC SN 800, URALAC SN 805, URALAC SN 808, URALAC SN 842, URALAC SN 859, URALAC SN 860, URALAC SN 905, URALAC 908, URALAC 989 or URALAC SN 978; those sold under the trade name ITALKID® commercially available from Galstaff-Multiresine, such as ITALKID 212, ITALKID 218, ITALKID 226, ITALKID 228, ITALKID 231 or ITALKID 300; those sold under the trade name DOMOPOL® commercially available from Helios, such as DOMOPOL 5101, DOMOPOL 5102, DOMOPOL 5111, DOMOPOL 5112, DOMOPOL 5113, DOMOPOL 5117, DOMOPOL 5132; those sold under the trade name DYNAPOL® commercially available from Evonik, such as DYNAPOL LH 318, DYNAPOL LH 818, DYNAPOL LH 820, DYNAPOL LH 823, DYNAPOL LH 830, DYNAPOL LH 833, DYNAPOL L 912, DYNAPOL L 952, DYNAPOL L 206, DYNAPOL L 860 or DYNAPOL L 600; those sold under the trade name URALAC® commercially available from DSM, such as URALAC P1580, URALAC 4215, URALAC 5080, URALAC 5930 or URALAC 6024; those sold under the trade name URADIL® commercially available from DSM, such as URADIL 250, URADIL 255, URADIL 258, URADIL SZ 260 or URADIL SZ 262; those sold under the trade name ITALESTER® commercially available from Galstaff-Multiresine, such as ITALESTER 217 or ITALESTER 218; and combinations thereof.

The polyester material may have any suitable number-average molecular weight (Mn). The polyester material may have an Mn from 500 Daltons (Da=g/mole) to 250,000 Da, suitably from 500 Da to 200,000 Da, such as from 1,000 Da to 150,000 Da, or even from 1,000 to 100,000 Da.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilised THF, retention time marker: toluene, sample concentration: 2 mg/ml).

The polyester material may have any suitable weight-average molecular weight (Mw). The polyester material may have an Mw from 500 Daltons (Da=g/mole) to 250,000 Da, suitably from 500 Da to 200,000 Da, such as from 1,000 Da to 150,000 Da, or even from 1,000 to 100,000 Da.

A person skilled in the art will appreciate that techniques to measure the number-average molecular weight may also be applied to measure the weight-average molecular weight.

The polyester material may have any suitable glass transition temperature (Tg). The polyester material may have a Tg from −20° C. to 120° C., suitably from 0° C. to 120° C., such as 10° C. to 105° C.

The glass transition temperature of the polyester material may be measured by any suitable method. Methods to measure Tg will be well known to a person skilled in the art. Suitably, and as reported herein, the Tg is measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The polyester material may have any suitable gross hydroxyl value (OHV). The polyester material may have a gross OHV from 0 to 120 mg KOH/g. Suitably, the polyester material may have a gross OHV from 0 to 110 mg KOH/g, such as from 10 to 110 mg KOH/g, or even from 10 to 100 mg KOH/g.

The gross OHV, as reported herein, is expressed on solids.

The polyester material may have any suitable acid value (AV). The polyester material may have an AV from 0 to 120 KOH/g. Suitably, the polyester may have a gross AV from 1 tp 100 mg KOH/g, such as from 1 to 20 mg KOH/g, or even from 1 to 10 mg KOH/g.

The AV as reported herein is expressed on solids.

The polyester material according to the present invention may be prepared in the presence of an esterification catalyst. Suitably, the esterification catalyst may be chosen to promote the reaction of components by esterification and/or trans-esterification. Suitable examples of esterification catalysts for use in the preparation of the polyester material include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; tetra-n-propyl titanate; tetra-n-butyl titanate; zinc acetate; acid compounds such as phosphoric acid; para-toluene sulphonic acid; dodecyl benzene sulphonic acid (DDBSA) and combinations thereof. The esterification catalyst may be dodecyl benzene sulphonic acid (DDBSA).

The esterification catalyst, when present, may be used in amounts from 0.001 to 1% by weight on total polymer components, suitably from 0.01 to 0.2%, such as from 0.025 to 0.2% by weight on total polymer components.

The polyester material may comprise the reaction product of;
(i) 1,2-propanediol,
(ii) terephthalic acid, and
(iii) a molecular weight increasing agent,
wherein the polyester material has a number-average molecular weight (Mn) of at least 6,100 Da and a glass transition temperature (Tg) of at least 80° C.

By "molecular weight increasing agent" we mean a substance that increases the number-average molecular weight (Mn) of the polyester material.

The molecular weight increasing agent may be any suitable compound capable of increasing the Mn of the polyester material. Suitably, the molecular weight increasing agent may comprise a polyacid, a polyol or combinations thereof.

The molecular weight increasing agent may comprise a polyacid. Suitably, the molecular weight increasing agent may comprise a diacid.

The molecular weight increasing agent comprises a diacid of general formula (I)

ROOC—$X_n$—COOR    formula (I)

wherein each R independently represents hydrogen or an alkyl, alkenyl, alkynyl, or aryl group; n=0 or 1; and wherein X represents a bridging group selected from: an alkylene group; an alkenylene group; an alkynylene group; an arylene group; wherein the bridge between the —COOR groups is $C_1$ or $C_2$.

Suitable examples of polyacid molecular weight increasing agents include, but are not limited to the following: oxalic acid; malonic acid; succinic acid; orthophthalic acid; maleic acid; fumaric acid; itaconic acid; methylmalonic acid; ethylmalonic acid; propylmalonic acid; 2-methylsuccinic acid; 2-ethylsuccinic acid; 2-propylsuccinic acid; trans-cyclopentane-1,2-dicaboxylic acid; cis-cyclopentane-1,2-dicaboxylic acid; trans-cyclohexane-1,2-dicaboxylic acid; cis-cyclohexane-1,2-dicaboxylic acid; acids and anhydrides of all the aforementioned acids and combinations thereof. The polyacid molecular weight increasing agents may comprise maleic anhydride, itaconic acid or a combination thereof.

Suitably, the polyacid molecular weight increasing agent may comprise maleic anhydride.

The molecular weight increasing agent may comprise a polyol. Suitably, the molecular weight increasing agent may comprise a triol.

The hydroxyl groups of the polyol molecular weight increasing agents may be connected by a $C_1$ to $C_3$ alkylene group. The $C_1$ to $C_3$ alkylene group may be substituted or unsubstituted. The $C_1$ to $C_3$ alkylene group may be optionally substituted with the following: halo; hydroxyl; nitro; mercapto; amino; alkyl; alkoxy; aryl; sulfo and sulfoxy groups. The $C_1$ to $C_3$ alkylene group may be linear or branched. The $C_1$ to $C_3$ alkylene group may be saturated or unsaturated.

Suitably, there may be no more than 3 carbon atoms connecting between the hydroxyl groups.

Suitable examples of polyol molecular weight increasing agents include, but are not limited to the following: methylene glycol; ethylene glycol; propylene glycol; neopentyl glycol; 1,2-propanediol; butyl ethyl propanediol; 2-methyl-1,3-propanediol; 2-ethyl-2-butyl-1,3-propanediol; trimethylolmethane; trimethylolethane; trimethylolpropane; glycerol; pentaerythritol; and combinations thereof. Suitably, the polyol molecular weight increasing agent comprises trimethylolpropane.

The terephthalic acid (ii) may be in any suitable form. It will be well known to a person skilled in the art that terephthalic acid is often provided in a form which also contains isophthalic acid as a contaminant. However, the terephthalic acid may be provided in a form which is substantially free of isophthalic acid. By "substantially free" we mean to refer to terephthalic acid which contains less than 5 wt % isophthalic acid, preferably less than 2 wt % isophthalic acid, more preferably less than 0.05 wt % isophthalic acid. The terephthalic acid may contain 0 wt % isophthalic acid.

The polyester material may comprise any suitable molar ratio of (i)+(ii):(iii). The molar ratio of (i)+(ii):(iii) may range from 100:1 to 1:1, such as from 80:1 to 5:1. As a non-limiting example, when the molecular weight increasing agent is a polyacid the molar ratio of (i)+(ii):(iii) may be 25:1. As a further non-limiting example, when the molecular weight increasing agent is a polyol the molar ratio of (i)+(ii):(iii) may be 80:1

The polyester material may have a low degree of branching. The polyester material may be substantially linear or be slightly branched. For example, the degree of branching of the polyester material, may be measured by the polydispersity index of the said high molecular weight polyester material. The polydispersity index of a polymer is given by the ratio of Mw to Mn (Mw/Mn), wherein Mw is the weight-average molecular weight and Mn is the number average molecular weight. Suitably, the polydispersity index of the polyester material is from 1 to 20, suitably from 1 to 10.

The polyester material may have a molecular weight above the entanglement molecular weight of said polyester material.

"Entanglement molecular weight" and like terms, as used herein, refers to the molecular weight at which the polyester material becomes large enough to entangle. For the avoidance of doubt the molecular weight may be the number-average molecular weight or the weight-average molecular weight. Entanglement molecular weight is typically defined as the molecular weight at which the physical properties, especially the viscosity of the polyester material, change.

Typically, the entanglement molecular weight is determined by plotting the log of the melt viscosity against the log of the molecular weight of a polymer. Typically, as the molecular weight increases, the plot follows a gently upward sloping linear path. However, once the entanglement molecular weight is reached, the gently sloping linear path increases to a rapidly sloping linear path. Hence the entanglement molecular weight may be determined as the point on the plot where the slope changes from gently sloping to rapidly sloping.

Techniques to measure the melt viscosity will be well known to a person skilled in the art. Suitably, the melt viscosity may be measured at a high shear rate such as that applied by a cone and plate rheometer, typical methods are as described in standard methods such as ASTM D4287. Films formed from the polyester material according to the present invention having a molecular weight above the critical entanglement molecular weight of the said polyester material, were found to have superior film forming properties.

The components (i), (ii) and (iii) of the polyester material may be contacted in any order.

The polyester material may be prepared in a one step process. Suitably, in a one step process, the components (i), (ii) and (iii) are all reacted together at the same time.

Suitably, the polyester material may be prepared in a one step process where the molecular weight increasing agent comprises a polyol.

Suitably, in a one step process, components (i), (ii) and (iii) may be contacted together at a first reaction temperature, T1, wherein T1 may be a temperature of between 90° C. and 260° C., suitably from 200° C. to 250° C., such as from 200° C. to 230° C.

Typically, in a one step process, the reaction is allowed to proceed for a total period of 1 minute to 100 hours, such as from 2 hours to 80 hours. It will be appreciated by a person skilled in the art that the reaction conditions may be varied depending on the reactants used.

The polyester material may be present in the coating compositions of the present invention in any suitable amount. The coating compositions may comprise from 40 to 95 wt %, suitably from 50 to 95 wt %, such as from 60 to 90 wt % of the polyester material based on the total solid weight of the coating composition. Suitably, the coating composition may comprise 70 to 80 wt % of the first polyester resin material based on the total solid weight of the coating composition.

The coating compositions of the present invention comprise benzoguanamine or a derivative thereof. The benzoguanamine or derivative thereof may comprise commercially available benzoguanamine or derivative thereof. Suitable examples of commercially available benzoguanamine and its derivatives include, but are not limited to the following; benzoguanamine-formaldehyde based materials such as CYMEL® 1123 (commercially available from Cytec Industries), ITAMIN® BG143 (commercially available from Galstaff Multiresine) or MAPRENAL® BF892 (commercially available from Ineos); glycoluril based materials, such as CYMEL 1170 and CYMEL 1172 (commercially available from Cytec); and combinations thereof.

Benzoguanamine or a derivative thereof may be present in the coating composition of the present invention in any suitable amount. The coating composition may comprise at least 1 wt %, suitably at least 2 wt %, such as at least 3 wt %, or even at least 4 wt % of benzoguanamine or a derivative thereof based on the total solid weight of the coating composition. Suitably, the coating composition may comprise at least 4.5 wt % of benzoguanamine or a derivative thereof based on the total solid weight of the coating composition. The coating composition may comprise up to 40 wt %, suitably up to 30 wt %, such as up to 20 wt %, or even up to 15 wt % of benzoguanamine or a derivative thereof based on the total solid weight of the coating composition. Suitably, the coating composition may comprise up to 10 wt % of benzoguanamine or a derivative thereof based on the total solid weight of the coating composition. The coating composition may comprise from 1 to 40 wt %, suitably from 1 to 30 wt %, such as from 1 to 20 wt %, or even from 1 to 15 wt % of benzoguanamine or a derivative thereof based on the total solid weight of the coating composition. Suitably, the coating composition may comprise from 1 to 10 wt % of benzoguanamine or a derivative thereof based on the total solid weight of the coating composition. The coating composition may comprise from 2 to 40 wt %, suitably from 2 to 30 wt %, such as from 2 to 20 wt %, or even from 2 to 15 wt % of benzoguanamine or a derivative thereof based on the total solid weight of the coating composition. Suitably, the coating composition may comprise from 2 to 10 wt % of benzoguanamine or a derivative thereof based on the total solid weight of the coating composition. The coating composition may comprise from 3 to 40 wt %, suitably from 3 to 30 wt %, such as from 3 to 20 wt %, or even from 3 to 15 wt % of benzoguanamine or a derivative thereof based on the total solid weight of the coating composition. Suitably, the coating composition may comprise from 3 to 10 wt % of benzoguanamine or a derivative thereof based on the total solid weight of the coating composition. The coating composition may comprise from 4 to 40 wt %, suitably from 4 to 30 wt %, such as from 4 to 20 wt %, or even from 4 to 15 wt % of benzoguanamine or a derivative thereof based on the total solid weight of the coating composition. Suitably, the coating composition may comprise from 4 to 10 wt % of benzoguanamine or a derivative thereof based on the total solid weight of the coating composition. The coating composition may comprise from 4.5 to 40 wt %, suitably from 4.5 to 30 wt %, such as from 4.5 to 20 wt %, or even from 4.5 to 15 wt % of benzoguanamine or a derivative thereof based on the total solid weight of the coating composition. Suitably, the coating composition may comprise from 4.5 to 10 wt % of benzoguanamine or a derivative thereof based on the total solid weight of the coating composition.

The coating compositions of the present invention may optionally comprise a further crosslinking material. The further crosslinking material may be a single molecule, a dimer, an oligomer, a (co)polymer or a mixture thereof. The crosslinker may be a dimer or trimer.

The further crosslinking material may comprise any suitable crosslinking material. Suitable crosslinking materials will be well known to the person skilled in the art. Suitable crosslinking materials include, but are not limited to the following: phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof. Suitably, the crosslinking material may comprise a phenolic resin, an isocyanate resin or combinations thereof. Suitably, therefore, the coating composition may comprise a polyester material, benzoguanamine or a derivative thereof and a further crosslinking material comprising a phenolic resin and an isocyanate resin.

Non-limiting examples of phenolic resins are those formed from the reaction of a phenol with an aldehyde or a ketone, suitably from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Cytec Industries, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Momentive, such as BAKELITE 6582 LB, BAKELITE 6535, BAKELITE PF9989 or BAKELITE PF6581; SFC 112 commercially available from Schenectady; DUREZ® 33356 commercially available from SHHPP; ARALINK® 40-852 commercially available from Bitrez; or combinations thereof.

The coating composition may be substantially phenol free, or suitably essentially phenol free, or suitably completely phenol free. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

Non limiting examples of isocyanate resins include, but are not limited to the following: isophorone diisocyanate (IPDI), such as those sold under the trade name DESMODUR® commercially available from Bayer, for example DESMODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocyanate (HDI), such as those sold under the trade name DESMODUR® commercially available from Bayer, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Perstorp, for example TOLONATE D2 or those sold under the trade name TRIXENE® commercially available from Baxenden, for example TRIXENE-BI-7984 or TRIXENE 7981; or combinations thereof.

The further crosslinking material may be present in the coating compositions of the present invention is any suitable amount. The coating compositions may comprise from 0.5 to 70 wt %, suitably from 2.5 to 50 wt %, such as from 5 to 30, or even from 7.5 to 30 wt % of the crosslinking material based on the total solid weight of the coating composition. Suitably, the coating compositions may comprise from 7.5 to 25 wt % of the crosslinking material based on the total solid weight of the coating composition.

The further crosslinking material may comprise a phenolic resin.

The phenolic resin, when present, may be present in the coating compositions of the present invention in any suitable amount. The phenolic resin, when present, may be present in the coating compositions in amounts from 1 to 40 wt %, suitably from 2.5 to 30 wt %, such as from 5 to 20 wt %, or even from 7.5 to 20 wt % based on the total solid weight of the coating composition. Suitably, the phenolic resin, when present, may be present in the coating compositions in amounts from 7.5 to 15 wt % based on the total solid weight of the coating composition.

The coating composition suitably comprises:
 a polyester material, and
 a crosslinking material comprising a phenolic resin, and
  benzoguanamine or a
  derivative thereof,
 wherein the coating composition is substantially free of bisphenol A (BPA), bisphenol F (BPF), bisphenol A diglycidyl ether (BADGE) and bisphenol F diglycidyl ether (BFDGE).

The further crosslinking material may comprise an isocyanate resin.

The isocyanate resin, when present, may be present in the coating compositions of the present invention in any suitable amount. The isocyanate resin, when present, may be present in the coating compositions in amounts from 0.5 to 30 wt %, suitably from 1 to 20 wt %, such as from 1.5 to 10 wt %, based on the total solid weight of the coating composition. Suitably, the isocyanate resin, when present, may be present in the coating compositions in amounts from 2 to 10 wt % based on the total solid weight of the coating composition.

The coating composition suitably comprises:
 a polyester material, and
 a crosslinking material comprising an isocyanate resin, and benzoguanamine or a derivative thereof,
 wherein the coating composition is substantially free of bisphenol A (BPA), bisphenol F (BPF), bisphenol A diglycidyl ether (BADGE) and bisphenol F diglycidyl ether (BFDGE).

The isocyanate resin may be present in the coating compositions of the present invention in any suitable amount. The coating compositions may comprise from 0.5 to 30 wt %, suitably from 1 to 20 wt %, such as from 1.5 to 10 wt % isocyanate resin based on the total solid weight of the coating composition. Suitably, the coating compositions may comprise from 2 to 10 wt % isocyanate resin based on the total solid weight of the coating composition.

The coating compositions according to the present invention are substantially free of bisphenol A (BPA) and derivatives thereof. The coating compositions according to the present invention may be essentially free or may be completely free of bisphenol A (BPA) and derivatives thereof. Derivatives of bisphenol A include, for example, bisphenol A diglycidyl ether (BADGE).

The coating compositions according to the present invention are substantially free of bisphenol F (BPF) and derivatives thereof. The coating compositions according to the present invention may be essentially free or may be completely free of bisphenol F (BPA) and derivatives thereof. Derivatives of bisphenol F include, for example, bisphenol F diglycidyl ether (BPFG).

The compounds or derivatives thereof mentioned above, i.e. BPA, BPF and derivatives thereof, may not be added to the coating composition intentionally but may be present in trace amounts because of unavoidable contamination from the environment. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions according to the first, third, fourth, sixth, seventh and/or ninth aspects of the present invention, when cured, may have a flexibility of at least 20 mm as measured according to the draw and re-draw test method with processing in 1% salt (NaCl) solution in tap water at 130° C. for 60 minutes. The coating compositions according to the tenth, eleventh, twelfth, thirteenth, fourteenth and/or fifteenth aspects of the present invention, when cured, have a flexibility of at least 20 mm as measured according to the draw and re-draw test method with processing in 1% salt (NaCl) solution in tap water at 130° C. for 60 minutes. The coating compositions according to the first, third, fourth, sixth, seventh, ninth, tenth, eleventh, twelfth, thirteenth, fourteenth and/or fifteenth aspects of the present invention may have a flexibility of at least 22 mm, suitably, at least 24 mm, such as at least 25 mm as measured according to the draw and re-draw test method with processing in 1% salt (NaCl) solution in tap water at 130° C. for 60 minutes.

Draw and re-draw is a test method well known to a person skilled in the art for measuring the flexibility of a coating. The test is performed as follows. A tin plate panel of 0.19 mm thickness and 5.6 gsm (grams per square metre, $gm^{-2}$) tin is bar coated with 8 gsm of a coating to form a coated panel. In a first step, the coated panel is placed under a stamping machine and a cylindrical cup having a height of 18 mm and a diameter of 30 mm is stamped from the panel. In a second step, the cylindrical cup is drawn into a cylindrical can having a height of 26 mm and a diameter of 24 mm. In a third step, the cylindrical can is processed in 1% salt (NaCl) solution in tap water. The cylindrical can is placed in a container containing the simulant such that it is submerged in the solution. The container is then placed in an autoclave and processed at 130° C. for 60 minutes. The coating on the outer side wall of the resulting cylindrical can is inspected visually for damage and rated numerically. The side wall has a height of 26 mm and the height of the undamaged coating in mm is measured from the bottom of the side wall is expressed as a number compared to 26, i.e. a result of 20 mm means that from the bottom the height of undamaged coating is 20 mm out of the complete side wall height of 26 mm, i.e. the upper 6 mm on the side wall is damaged and is observed as coating becoming detached from the metal surface. A result of 26 mm means that the sidewall is completely undamaged, whereas a result of 0 mm means that all of the coating on the side wall is damaged. The assessment of the sample is carried out by visual inspection immediately after the three stage process is completed and with no additional treatment of the sample. The stamping process and visual inspection is carried out at 20° C.

The coating compositions according to the first, third, fourth, sixth, seventh and/or ninth aspects of the present invention may have, when cured, a scratch resistance of at least 700 g as measured according to ISO standard 1518-1:2011 ('Paints and varnishes—Determination of scratch resistance, Part 1: Constant-loading method'). The coating compositions according to the tenth, eleventh, twelfth, thirteenth, fourteenth and/or fifteenth aspects of the present invention have, when cured, a scratch resistance of at least 700 g as measured according to ISO standard 1518-1:2011 ('Paints and varnishes—Determination of scratch resistance, Part 1: Constant-loading method').

In this method, a scratch stylus loaded with a specific load is drawn over the coating at a constant speed. The minimum load required to cause penetration of the coating is measured in accordance with section 7.4 of ISO standard 1518-1:2011. Typically, a coated metal panel is clamped in a panel holder of the scratch apparatus with the coating facing upwards. The scratch stylus has a tungsten carbide ball tip, is 1 mm in diameter and is fixed in the load beam of the scratch apparatus such that the stylus is perpendicular to the coated metal panel. Measurements are typically carried out by drawing the stylus over the coating at a constant rate of 3-4 cm/sec, starting at a load which is less than that expected to cause penetration of the coating. Progressively the load on the scratch stylus is increased (in increments of 100 g) until and measurements are repeated until the coating is penetrated. The weight in grams (g) required to cause penetration of the coating is recorded. Typically, measurements are repeated in triplicate.

Suitably, the metal panel used in the method of ISO standard 1518-1:2011 may be formed from, for example, tinplate or tin-free steel (TFS). It will be appreciated by a person skilled in the art that the coating compositions of the first, third, fourth, sixth, seventh and/or ninth aspects of the present invention may have a flexibility of at least 700 g as measured according to ISO standard 1518-1:2011 when the metal panel used is formed from tinplate or tin-free steel (TFS). It will be appreciated by a person skilled in the art that the coating compositions of the tenth, eleventh, twelfth, thirteenth, fourteenth and/or fifteenth aspects of the present invention have a flexibility of at least 700 g as measured according to ISO standard 1518-1:2011 when the metal panel used is formed from tinplate or tin-free steel (TFS).

When the metal panel used in the method of ISO standard 1518-1:2011 is formed from tinplate, the coating compositions according to the first, third, fourth, sixth, seventh and/or ninth aspects of the present invention may have a flexibility of at least 700 g as measured according to ISO standard 1518-1:2011. When the metal panel used in the method of ISO standard 1518-1:2011 is formed from tinplate, the coating compositions according to the tenth, eleventh, twelfth, thirteenth, fourteenth and/or fifteenth aspects of the present invention have a flexibility of at least 700 g as measured according to ISO standard 1518-1:2011.

When the metal panel used in the method of ISO standard 1518-1:2011 is formed from tin-free steel (TFS), the coating compositions according to the first, third, fourth, sixth, seventh and/or ninth aspects of the present invention may have a flexibility of at least 700 g, suitably at least 1,000 g, such as at least 1,200 g, or even at least 1,400 g as measured according to ISO standard 1518-1:2011. When the metal panel used in the method of ISO standard 1518-1:2011 is formed from tin-free steel (TFS), the coating compositions according to the tenth, eleventh, twelfth, thirteenth, fourteenth and/or fifteenth aspects of the present invention have a flexibility of at least 700 g. Suitably, when the metal panel used in the method of ISO standard 1518-1:2011 is formed from tin-free steel (TFS), the coating compositions according to the tenth, eleventh, twelfth, thirteenth, fourteenth and/or fifteenth aspects of the present invention may have a flexibility of at least 1,000 g, such as at least 1,200 g, or even at least 1,400 g as measured according to ISO standard 1518-1:2011.

It has surprisingly and advantageously been found by the present inventors that the coating compositions of the present invention having the above combination of physical properties can be used universally for a variety of different applications. For example, it has surprisingly and advantageously been found by the present inventors that the coating compositions of the present invention may be used on all parts of a food and/or beverage can such as a can and/or components used to fabricate such cans. It will be appreciated by a person skilled in the art that typically different coatings need to be applied to different parts of a can and/or the components used to fabricate such cans.

The coating compositions according to the present invention may further comprise a solvent. The coating composition may comprise a single solvent or a mixture of solvents. The solvent may comprise water, an organic solvent, a mixture of water and an organic solvent or a mixture of organic solvents.

The organic solvent suitably has sufficient volatility to essentially entirely evaporate from the coating composition during the curing process. As a non-limiting example, the curing process may be by heating at 130-230° C. for 1-15 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Rhodia); glycols such as butyl glycol; glycol ethers such as methoxypropanol; ethylene glycol monomethyl ether; ethylene glycol monobutyl ether and combinations thereof. The solvent, when present, may suitably be used in the coating composition in amounts from 1 to 90 wt %, suitably from 1 to 80 wt %, such as from 1 to 70 wt %, or even from 5 to 70 wt % based on the total solid weight of the coating composition. Suitably, the solvent, when present, may be used in the coating composition in amounts from 10 to 60 wt % based on the total solid weight of the coating composition.

The polyester material may be dissolved or dispersed in the said solvent during and/or after its formation.

The coating compositions of the present invention may further comprise a catalyst. Any catalyst typically used to catalyse crosslinking reactions between polyester materials and crosslinking agents, such as for example may be used. Suitable catalysts will be well known to the person skilled in the art. The catalyst may be a non-metal or a metal catalyst or a combination thereof. Suitable non-metal catalysts include, but are not limited to the following: phosphoric acid; blocked phosphoric acid; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof. The catalyst, when present, may be used in the coating composition in any suitable amount. The catalyst, when present, may be used in amounts from 0.001 to 10 wt %, suitably from 0.001 to 5 wt %, such as from 0.01 to 5 wt %, or even from 1 to 3 wt % based on the total solid weight of the coating composition. Suitably, the catalyst, when present, may be used in amounts from 0.01 to 1.5 wt % based on the total solid weight of the coating composition.

The coating compositions of the present invention may comprise a further resin material. Suitable further resin materials will be well known to a person skilled in the art. Suitable examples of further resin materials include, but are not limited to the following: polyester resins; acrylic resins; polyvinyl chloride (PVC) resins; alkyd resins; polyurethane resins; polysiloxane resins; epoxy resins or combinations thereof. Suitably, the further resin material may comprise polyvinyl chloride (PVC) resins.

The coating compositions of the present invention may comprise other optional materials well known in the art of formulating coatings, such as colorants, plasticizers, abrasion-resistant particles, anti-oxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts colour and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The coating compositions may comprise aluminium paste, aluminium powder, such as aluminium flake, or a combination thereof. Suitably, the coating compositions may comprise aluminium paste.

The colorant, when present, may be used in the coating composition in any suitable amount. The colorant, when present, may be used in the coating composition in amounts up to 90 wt %, such as up to 50 wt %, or even up to 10 wt % based on the total solid weight of the coating composition.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage can applications.

Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, suitably from 0.01 to 5 wt %, such as from 0.01 to 2 wt % based on the total solid weight of the coating composition.

The coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions of the present invention may be applied to a substrate, or a portion thereof, as a single layer or as part of a multi layer system. The coating composition may be applied as a single layer. The coating composition may be applied to a substrate once or multiple times. Suitably, the coating composition may form an undercoat layer. The second, third, fourth etc. coats may comprise any suitable paint such as those containing, for example, epoxy resins; polyester resins; polyurethane resins; polysiloxane resins; hydrocarbon resins or combinations thereof. Any or all of the layers may be substantially free, essentially free or completely free of BPA, BPF and derivatives thereof. Suitably, the coating composition may form an undercoat layer. Suitably, the coating composition may form an undercoat layer and the powder coating composition according to the present invention form an overcoat layer.

"Powder" and like terms as used herein, refers to materials that are in the form of solid particulates, as opposed to materials which are in the liquid form.

The powder coating composition of the present invention may be a thermosetting or thermoplastic powder coating composition. Suitably, the powder coating composition may be a thermoplastic coating composition.

The powder coating composition according to the present invention comprises a further polyester material. The further polyester material may comprise the reaction product of a polyacid and a polyol.

The further polyester material may be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; esters and anhydrides of all the aforementioned acids and combinations thereof.

The further polyester material may be formed from any suitable polyol. Suitable examples of polyols include, but are not limited to the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A;
cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

The further polyester material may be formed from any suitable molar ratio of polyacid:polyol. The molar ratio of polyacid:polyol in the further polyester material may be from 20:1 to 1:20, suitably from 10:1 to 1:10, such as from 5:1 to 1:5, or even from 2:1 to 1:2. Suitably, the molar ratio of polyacid:polyol in the further polyester material may be from 1.2:1.2, or even substantially 1:1.

The further polyester material may optionally be formed from an additional monomer. Suitably, the further polyester material may optionally include an additional monomer selected from monoacids or monohydric alcohols or combinations thereof. Suitably, the optional additional monomer may be organic.

The further polyester material may optionally be formed from an additional monoacid. "Monoacid", and like terms as used herein, refers to compounds having one carboxylic acid group and includes an ester of the monoacid (where the acid group is esterified) or an anhydride. The monoacid is suitably an organic monoacid.

The further polyester material may optionally be formed from any suitable additional monoacid. Suitable examples include, but are not limited to the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; undecanoic acid; lauric acid; isononanoic acid; fatty acids; hydrogenated fatty acids of naturally occurring oils; esters and/or anhydrides of any of the aforementioned acids and combinations thereof.

The further polyester material may optionally be formed from an additional monohydric alcohol. "Monohydric alcohol" and like terms as used herein, refers to compounds having one hydroxyl group. Suitably, the monohydric alcohol is an organic monohydric alcohol.

The further polyester material may optionally be formed from any suitable additional monohydric alcohol. Suitable examples include but are not limited to the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; phenol; phenyl carbinol; methylphenyl carbinol; cresol; monoethers of glycols; halogen-substituted or other substituted alcohols and combinations thereof.

The further polyester of the powder coating composition may have the same or different monomer make up (monomers and or amounts of each) as the coating composition.

The further polyester material may comprise commercially available polyester materials. Suitable commercially available polyester materials include, but are not limited to the following: those sold under the trade name URALAC® commercially available from DSM, such as URALAC SN 800, URALAC SN 805, URALAC SN 808, URALAC SN 842, URALAC SN 859, URALAC SN 860, URALAC SN 905, URALAC 908, URALAC 989 or URALAC SN 978; those sold under the trade name ITALKID® commercially available from Galstaff-Multiresine, such as ITALKID 212, ITALKID 218, ITALKID 226, ITALKID 228, ITALKID 231 or ITALKID 300; those sold under the trade name DOMOPOL® commercially available from Helios, such as DOMOPOL 5101, DOMOPOL 5102, DOMOPOL 5111, DOMOPOL 5112, DOMOPOL 5113, DOMOPOL 5117, DOMOPOL 5132; those sold under the trade name DYNAPOL® commercially available from Evonik, such as DYNAPOL LH 318, DYNAPOL LH 818, DYNAPOL LH 820, DYNAPOL LH 823, DYNAPOL LH 830, DYNAPOL LH 833, DYNAPOL L 912, DYNAPOL L 952, DYNAPOL L 206, DYNAPOL L 860, DYNAPOL P1500 or DYNAPOL L 600; those sold under the trade name URALAC® commercially available from DSM, such as URALAC P1580, URALAC 4215, URALAC 5080, URALAC 5930 or URALAC 6024; those sold under the trade name URADIL® commercially available from DSM, such as URADIL 250, URADIL 255, URADIL 258, URADIL SZ 260 or URADIL SZ 262; those sold under the trade name ITALESTER® commercially available from Galstaff-Multiresine, such as ITALESTER 217 or ITALESTER 218; those sold under the trade name Griltex® commercially available from Ems Chemi, such as Griltex® D 2036E or Griltex D 1573E; those sold under the trade name Schaetti Melt® commercially available from Schaetti AG, such as Schaetti Melt 3521; and combinations thereof. Suitably, the further polyester material may comprise those sold under the trade name GRILLTEX® commercially available from Ems Chemie, those sold under the trade name Schaetti Melt® commercially available from Schaetti AG or combinations thereof.

The further polyester material may have any suitable glass transition temperature (Tg). The further polyester material may have a Tg from −20° C. to 120° C., suitably from 0° C. to 100° C., such as from 10° C. to 75° C., such as from 15 to 50° C., such as from 15 to 40° C., or even from 15° C. to 50° C.

The glass transition temperature of the further polyester material may be measured by any suitable method. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The further polyester material may have any suitable melting temperature (Tm). The further polyester may have a Tm from 20 to 250° C., suitably from 50 to 225° C., such as from 100 to 200° C., or even from 120 to 175° C. Suitably, the further polyester material may have a Tm from 120 to 140° C., such as from 125 to 135° C. Suitably, the further polyester material may have a Tm from 140 to 170° C., such as from 150 to 165° C.

The melting temperature of the further polyester material may be measured by any suitable method. Methods to measure Tm will be well known to a person skilled in the art. Suitably, the Tm is measured by differential scanning calorimetry (DSC) according to ASTM E794-06(2012).

The further polyester material may comprise a single polyester material or may comprise a combination of two or more polyester materials.

The powder coating composition may comprise any suitable amount of further polyester material. The powder coating composition may comprise from 10 to 99 wt %, suitably from 20 to 90 wt %, such as from 30 to 80 wt %, such as from 40 to 75 wt %, or even from 50 to 70 wt % of the further polyester material based on the total solid weight of the powder coating composition. Suitably, the powder coating composition may comprise from 60 to 70 wt % of the further polyester material based on the total solid weight of the powder coating composition.

The powder coating composition may comprise at least 10 wt %, suitably at least 20 wt %, such as at least 30 wt %, such as at least 40 wt %, such as at least 50 wt %, or even at least 60 wt % of the further polyester material based on the total solid weight of the powder coating composition. The powder coating composition may comprise up to 99 wt %, suitably up to 90 wt %, such as up to 80 wt %, such as up to 75 wt %, or even up to 70 wt % of the further polyester material based on the total solid weight of the powder coating composition. The powder coating composition may comprise from 10 to 90 wt %, suitably from 20 to 90 wt %, such as from 30 to 90 wt %, such as from 40 to 90 wt %, such as from 50 to 90 wt %, or even from 60 to 90 wt % of the further polyester material based on the total solid weight of the powder coating composition. The powder coating composition may comprise from 10 to 80 wt %, suitably from 20 to 80 wt %, such as from 30 to 80 wt %, such as from 40 to 80 wt %, such as from 50 to 80 wt %, or even from 60 to 80 wt % of the further polyester material based on the total solid weight of the powder coating composition. The powder coating composition may comprise from 10 to 75 wt %, suitably from 20 to 75 wt %, such as from 30 to 75 wt %, such as from 40 to 75 wt %, such as from 50 to 75 wt %, or even from 60 to 75 wt % of the further polyester material based on the total solid weight of the powder coating composition. The powder coating composition may comprise from 10 to 70 wt %, suitably from 20 to 70 wt %, such as from 30 to 70 wt %, such as from 40 to 70 wt %, such as from 50 to 70 wt %, or even from 60 to 70 wt % of the further polyester material based on the total solid weight of the powder coating composition.

The powder coating compositions of the present invention may comprise other optional materials well known in the art of formulating coatings, such as crosslinking materials, colorants, plasticizers, abrasion-resistant particles, anti-oxidants, hindered amine light stabilizers, UV light absorbers and stabilizers, surfactants, flow control agents, thixotropic agents, fillers, catalysts, grind vehicles, lubricants, waxes and other customary auxiliaries. It will be appreciated by a person skilled in the art that when the powder coating composition is a thermoplastic powder composition, the powder coating composition will not require a crosslinking material. Suitably, therefore, when the powder coating composition is a thermoplastic powder composition, the powder coating composition may be substantially free of a crosslinking material.

Suitable optional materials are defined as above in relation to the coating composition of the first aspect of the present invention unless specified otherwise below. Suitable amounts of the optional materials, when present, are defined as above in relation to the coating composition of the first aspect of the present invention unless specified otherwise below.

The powder coating composition may comprise any suitable colorant. Suitable colorants are as defined above in relation to the coating composition of the first aspect of the present invention. Suitably, the powder coating composition may comprise titanium dioxide.

The powder coating composition may comprise any suitable filler. Suitably, the powder composition may comprise barium sulphate and/or mica.

The powder coating composition may comprise any suitable amount of colorant and/or filler. The coating composition may comprise from 1 to 90 wt %, suitably from 5 to 70 wt %, such as from 10 to 60 wt %, such as from 20 to 50 wt %, or even from 30 to 40 wt % pigment and/or filler based on the total solid weight of the powder coating composition.

The powder coating composition may comprise any suitable amount of colorant. The powder coating composition may comprise from 1 to 90 wt %, suitably from 2.5 to 50 wt %, such as from 5 to 30 wt %, or even from 10 to 20 wt % based on the total solid weight of the powder coating composition.

The powder coating composition may comprise any suitable amount of filler. The powder coating composition may comprise from 1 to 90 wt %, suitably from 5 to 50 wt %, such as from 10 to 40 wt %, such as from 15 to 30 wt %, or even from 15 to 25 wt % based on the total solid weight of the powder coating composition.

The powder coating compositions of the present invention may have any suitable average particle size. The powder coating compositions may have an average particle size from 1 to 1,000 microns (μm), suitably from 5 to 500 μm, such as from 5 to 250 μm, or even from 5 to 100 μm. Particles having these sizes may be produced by any suitable method. Suitable methods will be well known to a person skilled in the art. Examples of suitable methods include, but are not limited to, cold grinding and sieving methods.

The powder coating compositions of the present invention may be prepared by any suitable method. For example, the powder coating compositions may be prepared by first dry blending the polyester material and, if present, crosslinking agent, pigment and/or filler, curing agent and additives in a blender. The blender may be operated for any suitable period of time. Suitably, the blender may be operated for a period of time sufficient to result in a homogeneous dry blend of the materials charged thereto. The homogenous dry blend may then be melt blended in an extruder, such as a twin-screw co-rotating extruder, operated within a temperature range from 80 to 140° C., suitably from 100 to 125° C. The extrudate of the powder coating composition may be cooled and is typically milled to an average particle size as described above.

The powder coating composition of the present invention is suitably a curable coating composition. "Curable coating compositions" and like terms as used herein, refers to coating compositions that have an initial powder state and a final state in which the coating composition has been transformed into a substantially continuous, coalesced state.

The powder coating composition of the present invention may be cured by any suitable method. The powder coating composition may be cured by heat curing or by chemical curing, suitably by heat curing. The powder coating composition, when heat cured, may be cured at any suitable temperature. The powder coating composition, when heat cured, may be cured at temperatures from 50 to 350° C., suitably from 100 to 320° C., such as from 150 to 300° C., or even from 200 to 300° C.

Suitably, the coating composition, when present, is cured prior to application of the powder composition.

The coating compositions, powder coating compositions and/or coating systems according to the present invention may be applied to any suitable chromium free tinplate substrate. Examples of suitable chromium free tinplate substrates include, but are not limited to, food and/or beverage packaging or components used to fabricate such packaging. Suitably, the food and/or beverage packaging may be a can. Examples of cans include, but are not limited to one or more of the following, two-piece cans, three-piece cans and the like.

The coating compositions, powder coating compositions and/or coating systems may be applied to food and/or beverage cans or components used to fabricate such packaging.

Certain coating compositions, powder coating compositions and/or coating systems of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a food or beverage can at least partially formed from a chromium free tinplate material, wherein the chromium free tinplate material is coated on at least a portion thereof with any of the coating compositions, powder coating compositions and/or coating systems described above. The term "can" includes any type of metal can, container or any type of receptacle or portion thereof that is sealed by the food and/or beverage manufacturer to minimize or eliminate spoilage of the contents until such package is opened by the consumer. The term "food or beverage can(s)" is used herein to refer to cans, containers or any type of receptacle or portion thereof used to hold any type of food and/or beverage. The term "food or beverage can(s)" specifically includes food or beverage cans and also specifically includes "can ends" including "E-Z open ends", which are typically stamped from can end stock and used in conjunction with the packaging of food and beverages. The term "food or beverage cans" also specifically includes metal caps and/or closures such as bottle caps, screw top caps and lids of any size, lug caps, and the like. The food or beverage cans can include "two piece cans" and "three-piece cans" as well as drawn and ironed one-piece cans; such one piece cans often find application with aerosol products.

The coating compositions, powder coating compositions and/or coating systems can be applied to the interior and/or the exterior of the food or beverage can. The coating compositions, powder coating compositions and/or coating systems could also be applied as a rim coat to the bottom of the can. The rim coat functions to reduce friction for improved handling during the continued fabrication and/or processing of the can. The coating compositions, powder coating compositions and/or coating systems can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating compositions and/or coating systems described herein, and the decorated, coated can stock used to form various food or beverage cans.

It has surprisingly and advantageously been found by the present inventors that the coating compositions, powder coating compositions and/or the coating systems of the present invention may suitably be applied to any part of a food and/or beverage can or any of the components used to fabricate such cans, and show high adhesion to chromium free tinplate material. It is an advantage of the present invention that the coating compositions, powder coating compositions and/or coating systems of the present invention have suitable properties such that they may be applied to any part of a food and/or beverage can or any of the components used to fabricate such cans, even when those parts are formed from chromium free tinplate. For example, the coating compositions, powder coating compositions and/or the coating systems of the present invention may equally be applied to the body of a can and to an easy open end (EOE) of a can. For example, the coating compositions, powder coating compositions and/or the coating systems of the present invention may equally be applied to the body of a can and to a non-easy open end (NEOE) of a can. It would be appreciated by a person skilled in the art that typically different coatings would be applied to these different parts of a can. Furthermore, this is also the case when those parts of the can are formed from chromium free tinplate.

The coating compositions, powder coating compositions and/or coating systems according to the present invention may be applied to at least a portion of a food or beverage can. The coating compositions, powder coating compositions and/or coating systems according to the present invention may be applied to at least a portion of the chromium free tinplate material from which the food or beverage can is at least partially formed.

Suitably, the coating compositions, powder coating compositions and/or coating systems of the present invention may be applied to a food and/or beverage can with a seam line or weld along the body of the can. Suitably, the coating compositions, powder coating compositions and/or coating systems of the present invention may be applied to a seam line or weld along the body of a the food or beverage can. Suitably, the powder coating compositions of the present invention may be applied to a seam line or weld along the body of the food or beverage can.

The coating system of the present invention is particularly suitable to be used on a can formed from chromium free tinplate, wherein the coating composition is applied to most of the body of the can, but not along a seam line or weld line, then the powder coating composition is applied over the seam line or weld line and overlaps the coating composition. In this way, a portion of the powder coating composition contacts the chromium free tinplate, with another portion of the powder coating composition being overlaid on top of the coating composition.

The coating compositions, powder coating compositions and/or coating systems according to the present invention may be applied to the substrate by any suitable method. It will be appreciated by a person skilled in the art that the coating composition and powder coating composition of the coating systems may each independently be applied to the substrate by any suitable method. Methods of applying the coating compositions, powder coating compositions and/or coating systems according to the present invention will be well known to a person skilled in the art. Suitable application methods for the coating compositions and/or coating systems of the present invention include, but are not limited to the following: electrocoating such as, for example, ultra corona discharge; spraying; electrostatic spraying; dipping; rolling; brushing; and the like. Suitable application methods for the powder coating compositions according to the present invention include, but are not limited to one or more of the following: spray coating; roll coating; dipping; and electrocoating such as, for example, ultra corona discharge.

When the substrate is electrically conductive, the powder coating composition is typically electrostatically applied. Electrostatic spray application generally involves drawing the powder coating composition from a fluidized bed and propelling it through a corona field. The particles of the powder coating composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited coating composition to a maximum of 250 to 300 μm (microns), in some cases, 75 to 150 μm.

The coating compositions, powder coating compositions and/or coating systems of the present invention may be applied to any suitable dry film thickness. The coating compositions of the present invention may be applied to a dry film thickness from 4 to 40 microns (μm). The powder coating compositions of the present invention may be applied to a dry film thickness from 5 to 100 microns (μm).

The coating compositions, powder coating compositions and coating systems of the present invention are substantially free of bisphenol A (BPA) and derivatives thereof. The coating compositions, powder coating compositions and/or coating systems may be essentially free or may be completely free of bisphenol A (BPA) and derivatives thereof. Derivatives of bisphenol A include, for example, bisphenol A diglycidyl ether (BADGE). The coating compositions, powder coating compositions and coating systems according to the present invention are also substantially free of bisphenol F (BPF) and derivatives thereof. The coating compositions, powder coating compositions and/or coating systems may be essentially free or completely free of bisphenol F (BPF) and derivatives thereof. Derivatives of bisphenol F include, for example, bisphenol F diglycidyl ether (BPFG). The compounds or derivatives thereof mentioned above may not be added to the coating composition, powder coating composition and/or coating system intentionally but may be present in trace amounts because of unavoidable contamination from the environment. By "substantially free" we mean to refer to coating compositions, powder coating compositions and coating systems containing less than 1000 parts per million (ppm) of any of the compounds or derivatives thereof mentioned above. By "essentially free" we mean to refer to coating compositions, powder coating compositions and/or coating systems containing less than 100 ppm of any of the compounds or derivatives thereof mentioned above. By "completely free" we mean to refer to coating compositions, powder coating compositions and/or coating systems containing less than 20 parts per billion (ppb) of any of the compounds or derivatives thereof.

The coating compositions, powder coating compositions and/or coating systems according to the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions, powder coating compositions and/or coating systems containing less than 1000 parts per million (ppm) of any of the compounds or derivatives thereof mentioned above. By "essentially free" we mean to refer to coating compositions, powder coating compositions and/or coating systems containing less than 100 ppm of any of the compounds or derivatives thereof mentioned above. By "completely free" we mean to refer to coating compositions, powder coating compositions and/or coating systems containing less than 20 parts per billion (ppb) of any of the compounds or derivatives thereof.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" first polyester material, "a" powder coating composition, "a" coating composition, "an" isocyanate resin, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to. Additionally, although the present invention has been described in terms of "comprising", the processes, materials, and coating compositions detailed herein may also be described as "consisting essentially of" or "consisting of".

All of the features contained herein may be combined with any of the above aspects and in any combination.

For a better understanding of the invention, and to show how embodiments of the same may be carried into effect, reference will now be made, by way of example, to the following experimental data.

EXAMPLES

Coating Compositions
Coating Composition 1

Coating composition 1, containing a polyester material and benzoguanamine, was prepared according to the formulation in Table 1. All amounts are given in parts by weight (pbw) unless otherwise specified.

Items 1 to 9 were loaded into a vessel equipped with a stirring system and mixed at a speed of 1,500 rpm. Items 10 and 11 were mixed separately and then added to the vessel under stirring. Finally, items 12 and 13 were added and the contents of the vessel were mixed thoroughly by stirring.

The dry weight of benzoguanamine in coating composition example 1 is 5.65 wt % based on the total solid weight of coating composition example 1.

TABLE 1

Formulation of Coating Composition 1

|   |   | Coating Composition 1 |
|---|---|---|
| 1 | Polyester resin [1] | 57.16 |
| 2 | Benzoguanamine 1 [2] | 1.55 |
| 3 | Benzoguanamine 2 [3] | 2.95 |
| 4 | Phenolic crosslinker 1 [4] | 0.90 |
| 5 | Phenolic crosslinker 2 [5] | 8.97 |
| 6 | Isocyanate crosslinker [6] | 7.17 |
| 7 | Solvent 1 [7] | 10.36 |
| 8 | Additive [8] | 0.20 |
| 9 | Wax [9] | 2.66 |
| 10 | Catalyst [10] | 0.01 |
| 11 | Solvent 1 [7] | 0.09 |
| 12 | Solvent 3 [11] | 6.18 |
| 13 | Solvent 4 [12] | 1.80 |
|   | Total | 100 |

[1] a linear polyester made from ethylene glycol, 2-methyl 1,3 propanediol, terephthalic acid and isophthalic acid and having an Mn of approx. 10,000 g/mol and a Tg of 56° C.
[2] MAPRENAL (RTM) BF891 available from INEOS
[3] CYMEL (RTM) 1123 available from available from Allnex
[4] DUREZ (RTM) 33356 available from Sumitomo
[5] CURAPHEN (RTM) 40-852 available from Bitrez
[6] VESTANAT (RTM) EP-B 1186A available from Evonik
[7] Xylene
[8] BYK088 available from BYK-Chemie
[9] Lanolin wax (15 wt % solution)
[10] NACURE (RTM) 5925, a blocked acid catalyst available from King Industries Inc.
[11] 2-butoxyethylacetate
[12] Butyl acetate Coating Composition 2

Coating composition 2 is a commercial BPA NI powder side stripe available as PPG 5290-002/A from PPG.

Coating Composition 3

Coating composition 3 is a commercial BPA NI powder side stripe available as PPG 5290-003/A from PPG.

Comparative Coating Composition 1

Comparative coating composition 1 is a commercial BPA NI powder side stripe available as VECODUR (registered trade mark) VP1091 from Valspar.

The properties of the coatings were tested by the following methods. The results are shown in Tables 2 to 5.

Test Methods

Test Panel Preparation:

Coated panels were prepared by coating 4 cm×15 cm strips of tinplate sheet which had been pre-treated with either TATA passivation 505 (batch 20161076C), Arcelor passivation 555 (batch ANM64), TKS passivation 555 (batch WA230126id537) or US Steel passivation 555 (batch 1730062100100) in accordance with Tables 2 to 5. Each of these pre-treatments is a chrome-free passivation method. The undercoat, when present, was cured at 200° C. for 12 minutes. The powder overcoat was cured at 270° C., 295° C. or 320° C. for 45 seconds (in accordance with Tables 2 to 5).

Powder Side Stripe Adhesion:

Adhesion of the powder side stripe was tested the day after the test panels has been prepared. Using scissors, a V-shaped cut was made from the outside of the panel to the inside of the panel (with the sharp edge of the 'V' being on the inside of the panel). The substrate was then bent a number of times in opposite directions until the metal was broken. Once the metal had been broken, the powder side stripe was peeled, if possible, so as to remove it from the substrate. The peel angle was as close to 140° as possible. Loss of adhesion was measured in mm as the amount of powder side stripe that was peeled from the substrate.

TABLE 2

Results on tinplate treated with TATA passivation 505

| Tinplate | Undercoat | Powder Overcoat | Adhesion |
|---|---|---|---|
| *Overcoat cured at 270° C. for 45 seconds* | | | |
| TATA passivation 505 | None | Comparative coating composition 1 | Complete loss of adhesion |
| | None | Coating Composition 2 | 2 mm |
| | None | Coating Composition 3 | 1 mm |
| | Coating composition 1 | Comparative Coating composition 1 | 3 mm |
| | Coating composition 1 | Coating Composition 2 | 1 mm |
| | Coating composition 1 | Coating Composition 3 | 1 mm |
| *Overcoat cured at 295° C. for 45 seconds* | | | |
| TATA passivation 505 | None | Comparative coating composition 1 | Complete loss of adhesion |
| | None | Coating Composition 2 | 1 mm |
| | None | Coating Composition 3 | 0 mm |
| | Coating composition 1 | Comparative Coating composition 1 | Complete loss of adhesion |
| | Coating composition 1 | Coating Composition 2 | 1 mm |
| | Coating composition 1 | Coating Composition 3 | 0 mm |
| *Overcoat cured at 320° C. for 45 seconds* | | | |
| TATA passivation 505 | None | Comparative coating composition 1 | Complete loss of adhesion |
| | None | Coating Composition 2 | 2 mm |
| | None | Coating Composition 3 | 0 mm |
| | Coating composition 1 | Comparative Coating composition 1 | Complete loss of adhesion |
| | Coating composition 1 | Coating Composition 2 | 2 mm |
| | Coating composition 1 | Coating Composition 3 | 0 mm |

TABLE 3

Results on tinplate treated with Arcelor passivation 555

| Tinplate | Undercoat | Powder Overcoat | Adhesion |
|---|---|---|---|
| *Overcoat cured at 270° C. for 45 seconds* | | | |
| Arcelor passivation 555 Batch ANM64 | None | Comparative coating composition 1 | Complete loss of adhesion |
| | None | Coating Composition 2 | 3 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |
| *Overcoat cured at 295° C. for 45 seconds* | | | |
| Arcelor passivation 555 Batch ANM64 | None | Comparative coating composition 1 | Complete loss of adhesion |
| | None | Coating Composition 2 | 0 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |
| *Overcoat cured at 320° C. for 45 seconds* | | | |
| Arcelor passivation 555 Batch ANM64 | None | Comparative coating composition 1 | Complete loss of adhesion |
| | None | Coating Composition 2 | 0 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |

TABLE 4

Results on tinplate treated with TKS passivation 555

| Tinplate | Undercoat | Powder Overcoat | Adhesion |
|---|---|---|---|
| *Overcoat cured at 270° C. for 45 seconds* | | | |
| TKS passivation 555 Batch WA230126id537 | None | Comparative coating composition 1 | Complete loss of adhesion |
| | None | Coating Composition 2 | 2 mm |
| | None | Coating Composition 3 | 0 mm |
| | Coating composition 1 | Comparative Coating composition 1 | Complete loss of adhesion |
| | Coating composition 1 | Coating Composition 2 | 1 mm |
| | Coating composition 1 | Coating Composition 3 | 0 mm |
| *Overcoat cured at 295° C. for 45 seconds* | | | |
| TKS passivation 555 Batch WA230126id537 | None | Comparative coating composition 1 | Complete loss of adhesion |
| | None | Coating Composition 2 | 0 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |

TABLE 4-continued

Results on tinplate treated with TKS passivation 555

| Tinplate | Undercoat | Powder Overcoat | Adhesion |
|---|---|---|---|
| \multicolumn{4}{c}{Overcoat cured at 320° C. for 45 seconds} | | | |
| TKS passivation 555 Batch WA230126id537 | None | Comparative coating composition 1 | Complete loss of adhesion |
| | None | Coating Composition 2 | 0 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |

TABLE 5

Results on tinplate treated with US Steel passivation 555

| Tinplate | Undercoat | Powder Overcoat | Adhesion |
|---|---|---|---|
| \multicolumn{4}{c}{Overcoat cured at 270° C. for 45 seconds} | | | |
| US steel passivation 555 Batch 1730062100100 | None | Comparative coating composition 1 | Complete loss of adhesion |
| | None | Coating Composition 2 | 2.75 mm |
| | None | Coating Composition 3 | 1 mm |
| | Coating composition 1 | Comparative Coating composition 1 | 3 mm |
| | Coating composition 1 | Coating Composition 2 | 2 mm |
| | Coating composition 1 | Coating Composition 3 | 1 mm |
| \multicolumn{4}{c}{Overcoat cured at 295° C. for 45 seconds} | | | |
| US steel passivation 555 Batch 1730062100100 | None | Comparative coating composition 1 | Complete loss of adhesion |
| | None | Coating Composition 2 | 3 mm |
| | None | Coating Composition 3 | 0 mm |
| | Coating composition 1 | Comparative Coating composition 1 | Complete loss of adhesion |
| | Coating composition 1 | Coating Composition 2 | 0 mm |
| | Coating composition 1 | Coating Composition 3 | 0 mm |
| \multicolumn{4}{c}{Overcoat cured at 320° C. for 45 seconds} | | | |
| US steel passivation 555 Batch 1730062100100 | None | Comparative coating composition 1 | Complete loss of adhesion |
| | None | Coating Composition 2 | 7 mm |
| | None | Coating Composition 3 | 0 mm |
| | Coating composition 1 | Comparative Coating composition 1 | 2 mm |
| | Coating composition 1 | Coating Composition 2 | 2 mm |
| | Coating composition 1 | Coating Composition 3 | 0 mm |

The results show that the coating compositions and/or systems according to the present invention have improved adhesion to the substrate compared to the comparative examples.

Attention is directed to all papers and documents which are filed concurrently with or previous to this specification in connection with this application and which are open to the public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract or drawings), or to any novel one, or any novel combination, of the steps of any method or process so disclosed.

The invention claimed is:

1. A coating system on a chromium free tinplate substrate the coating system comprising:
   an undercoat coating composition comprising a polyester material, and a crosslinking material comprising benzoguanamine or a derivative thereof, wherein the crosslinking material further comprises a phenolic resin and an isocyanate resin; and
   an overcoat coating composition comprising a powder composition comprising a further polyester material,
   wherein the undercoat coating composition is substantially free of bisphenol A (BPA), bis phenol F (BPF), bisphenol A diglycidyl ether (BADGE) and bisphenol F diglycidyl ether (BFDGE).

2. The coating system of claim 1, wherein the undercoat coating composition comprises at least 4.5 wt. % of the benzoguanamine or a derivative thereof based on the total solid weight of the undercoat coating composition.

3. The coating system of claim 1, wherein the powder coating composition is a thermoplastic coating composition.

4. A food or beverage can at least partially formed from a chromium free tinplate material, wherein the chromium free tinplate material is coated on at least a portion thereof with the coating system of claim 1.

5. The food or beverage can of claim 4, wherein the coating system is applied to a seam line or weld along the body of the food or beverage can.

6. The coating system of claim 1, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

* * * * *